United States Patent [19]
Wilkenloh et al.
[11] 4,107,354
[45] Aug. 15, 1978

[54] COATING ELECTRICALLY CONDUCTIVE WIRE WITH POLYOLEFIN

[75] Inventors: Frederic Nash Wilkenloh, Conover; Paul Alan Wilson, Hickory; Steve Allen Fox, Taylorsville, all of N.C.

[73] Assignee: Comm/Scope Company, Catawba, N.C.

[21] Appl. No.: 782,361

[22] Filed: Mar. 29, 1977

Related U.S. Application Data

[62] Division of Ser. No. 584,164, Jun. 5, 1975, abandoned.

[51] Int. Cl.² .............................................. B29D 27/00

[52] U.S. Cl. ................................ 427/118; 174/102 R; 156/51; 521/74; 260/2.5 E; 264/45.9; 264/50; 264/51; 264/53; 264/54; 264/174; 264/DIG. 5; 264/DIG. 13; 427/119; 427/120; 427/243; 521/79

[58] Field of Search .................... 264/45.9, 50, 51, 53, 264/54, 174, DIG. 5, DIG. 13; 156/51; 427/119, 120, 118, 243; 260/2.5 HA, 2.5 E; 174/102 R

[56] References Cited

U.S. PATENT DOCUMENTS

| | | | |
|---|---|---|---|
| 3,645,929 | 2/1972 | Normanton | 427/119 |
| 3,766,099 | 10/1973 | Kawai et al. | 260/2.5 HA |
| 3,810,964 | 5/1974 | Ehrenfreund | 260/2.5 HA |
| 3,882,209 | 5/1975 | Yanagisawa | 260/2.5 HA |
| 3,968,463 | 7/1976 | Boyson | 260/2.5 HA |
| 4,020,025 | 4/1977 | Zeitler | 260/2.5 HA |

FOREIGN PATENT DOCUMENTS

| | | | |
|---|---|---|---|
| 1,434,775 | 5/1976 | United Kingdom | 260/2.5 HA |

OTHER PUBLICATIONS

Nakahara et al., "A Highly Expanded Polyethylene CATV Coaxial Cable," 22 IW & C Symposium, 12-1973.

*Primary Examiner*—John D. Smith

[57] ABSTRACT

Disclosed is a coaxial cable having greatly improved mechanical and electrical properties derived from a foamed dielectric having a dielectric constant in the range of 1.32 to 1.1, such cable being provided by a novel method of coating a center conductor of the cable with a dielectric with an extruded cellular polyolefin base composition which has been rendered cellular by the direct injection of a blowing agent in a liquid form into the polymer during an extrusion process. Also disclosed is an apparatus and a method of continuous wire electropolishing and pre-coating.

9 Claims, 11 Drawing Figures

COATING ELECTRICALLY CONDUCTIVE WIRE WITH POLYOLEFIN

This is a division of application Ser. No. 584,164 filed June 5, 1975 now abandoned in favor of application Ser. No. 804,520 filed June 8, 1977, which is a continuation of application Ser. No. 584,164 now abandoned filed June 5, 1975.

FIELD OF INVENTION

This invention relates to coaxial cable and the method of making same, having as a dielectric coating on the center conductor an extruded cellular polyolefinic base composition.

BACKGROUND

Coaxial cables usually comprise a core (or center conductor member coated with a dielectric), with an outer conductor member coaxially superimposed on the dielectric. The center conductor member and the outer conductor member are made with some appropriate metal, e.g. copper, aluminum and appropriate alloys of same, and the dielectric is usually composed of some suitable plastic, e.g. polyethylene, polystyrene, polypropolyene. The dielectric can either be in the expanded (foam) or unexpanded (solid) form.

COMMERCIAL COAXIAL CABLE — Type 1

Over the past 21 years, there has existed commercially available coaxial cable having a dielectric of expanded polyethylene (ethylene polymer) hereinafter referred to in this disclosure as Type 1 coaxial cable. For example, Superior Continental Corporation's Type 1 coaxial cable was sold under the trademarks ALUMAGARD and COPPERGARD. Such cable usually employs a low density polyethylene (nominal density of 0.92 grams per cubic centimeter in its unexpanded form, i.e., a chemical blowing agent is included. During the extrusion process of such compounded polyethylene, heat and pressure causes the chemical blowing agent to decompose, thereby releasing nitrogen gas, moisture vapor and solid by-product residue. The by-product residue usually manifests itself in minute solid particles, which form sites for cell formation. These particles react with generated nitrogen to form cells and to thus expand the molten polyethylene upon release of extrusion pressures, e.g. when the molten material exits from an extruder. Composite foam density (polyethylene plus gas) for this type of coaxial cable is typically about 0.42 g/cc with a dielectric constant of approximately 1.50. Because water vapor released during the foaming stage of manufacture is trapped in the cells, the dissipation factor of the dielectric is initially very high. A separate manufacturing process, a drying step, is necessary to rid the cells of the unwanted water vapor. Such a step increases the water vapor partial pressure in the cells and forces the water vapor through partially permeable cell walls, thus allowing water vapor to be expelled. After drying, the cable dissipation factor is normally in the region of 250 to 700 microradians measured in the 5–300 mHz range. In an article published in 1967 entitled "Electrical Design Parameters For Coaxial Cable" by Mark Wolf for presentation at the 1967 U.S. Independent Telephone Association Convention, foamed polyethylene coaxial cables having dissipation factors ranging from 160 to 800 microradians are disclosed. Type 1 commerical coaxial cable foam polyethylene dielectric has been used in coaxial cable for some 21 years or more, the method used to manufacture it, up to the present time, being the only known way to create expanded foam polyethylene that would possess electrical characteristics suitable for use as a dielectric in high frequency coaxial cable.

COMMERCIAL COAXIAL CABLE — Type 2

Beginning sometime in August, 1973, a new and improved type of coaxial cable was introduced to the public, which used expanded polyethylene material for the dielectric. Type 2 coaxial cable dielectric is comprised of a proprietary compounded polyethylene purchased from Union Carbide, identified by a number 4965. As supplied, the material appears to be a low-density polyethylene (0.92 g/cc) with a melt index of 0.1 decigrams/minute. This material is disclosed in U.S. patent applications Ser. Nos. 386,749 filed Aug. 9, 1973 entitled "Coaxial Cable with Improved Properties and Process", now abandoned and 491,345 filed July 24, 1974, now U.S. Pat. No. 3,968,463 entitled "Coaxial Cable With Improved Properties and Process." See also Belgian Pat. No. 818,568 having an issue date of Aug. 7, 1974 corresponding to the aforementioned abandoned United States application.

Compounded with such polyethylene are certain nucleants. However, contrary to past practice — which employed the chemical decomposition products of certain added materials (chemical blowing agents for example) either compounded or mixed with the polyethylene — nucleants in the Union Carbide polyethylene were not relied upon to decompose and to crease a gas that would, in turn, cause a vesicular (foam) structure in the polyethylene during manufacture. Instead, nitrogen in a gaseous state is directly injected into the extruder barrel from an exterior reservoir during the extrusion process to create the vesicular (foam) polyethylene structure. After the nitrogen/polymer mixture leaves an extruder, expansion of the molten polyethylene takes place, but without decomposition of the nucleating agent, thus without any deleterious by-products being formed. Coaxial cable made in using this process of manufacturing typically has a foam density between 0.3 and 0.6 g/cc and a dielectric constant between 1.475 and 1.63. Examples of attenuation (db/100 feet cable) and dissipation factor* of cable made by this process are as follows:

*Dissipation factors for this type cable are essentially equal to those known to be associated with Type 1 coaxial cable in the same frequency range.

TABLE I

| Frequency mHz | Attenuation db/100 feet cable | Dissipation Factor Microradians |
|---|---|---|
| 5 | 0.21 | −340 |
| 50 | 0.59 | −210 |
| 100 | 0.81 | −185 |
| 250 | 1.32 | −180 |
| 300 | 1.49 | −210 |

COMMERCIAL COAXIAL CABLE — Type 3 (Polystyrene Dielectric)

Also known to the public is a coaxial cable using polystyrene as the dielectric. Expanded dielectric material for this type of coaxial cable is basically derived from basic polystyrene beads mixed with citric acid, the resulting mixture being steeped in liquid pentane. A quantity of sodium bicarbonate is added to the steeped mixture prior to extrusion. During extrusion, the pentane gas acts as a blowing agent and is released upon reaction of the citric acid and the sodium bicarbonate. Such a reaction forms nucleating sites, with the pentane gas forming the desired cellular structure. Expanded polystyrene material is extremely hygroscopic (multiplicity of holes in cell walls) thus requiring manufacturing facilities to maintain a precise humidity because water in any form is deleterious to desired electrical properties. In service applications of polystyrene coaxial cable also have to consider the hydroscopic nature of this material and also that it will not bond adequately to a center conductor wire to prevent moisture from migrating between the dielectric and center conductor. The relative dielectric constant of the polystyrene, in this expanded form, is approximately 1.16 and as expected, polystyrene with such dielectric constant has a very desirable attenuation characteristic at high frequencies.

Coaxial cable having a dielectric made from expanded polystyrene has very undesirable mechanical characteristics because of the brittleness of the expanded polystyrene. Also, manufacturing of polystyrene coaxial cable core has its special problems. For example, any in-process polystyrene coated center conductor (core) must have an outer conductor swedged on it within seven days of extrusion because the slow release of pentance increases the brittleness of the expanded polystyrene. Because of the hydroscopic nature of the expanded polystyrene, the manufacturing environment itself must be precisely controlled with respect to humidity. Furthermore, the wall thickness of the outer electrical conductor of a coaxial cable using expanded polystyrene must be significantly increased over that used with an expanded polyethylene in order to overcome the poor mechanical nature of the expanded polystyrene coaxial cable. Additionally, when such cable is installed, special handling techniques must be used because of the expanded polystyrene brittleness. Furthermore, it has been found that unless the terminal ends of a length of polystyrene coaxial cable are hermetically sealed prior to shipment, moisture or water vapor has the tendency to migrate along the expanded polystyrene center conductor interface thereby causing corrosion of the center conductor and increased high frequency attenuation loss. In other words, the bond between the polystyrene dielectric and the center conductor is insufficient to keep out water or water vapor. Additionally, expanded polystyrene coaxial cable, if terminated in a repeater housing, presents a situation whereby pentane gas trapped in the polystyrene by the outer conductor tends to migrate along the cable length, accumulate in such a repeater housing and create a situation where a workman would run the risk of an explosion if such pentane were to come in contact with an open flame or spark. Of course, as the pentane escapes, the polystyrene brittleness increases thereby, after a given length of time, putting into question the viability of the cable, i.e., it may become so fragile that it cannot be handled.

Reference is made to FIGS. 2A, 2B and 2C showing plots of attenuation (db/100 feet) vs. frequency (mHz) for Type 1. Type 2 and Type 3 coaxial cable. Throughout this entire disclosure, it is to be constantly kept in mind that the plots for Type 3 coaxial cable shown in FIGS. 2A, 2B and 2C also represent plots for the same electrical characteristics of the coaxial cable envisioned by the instant disclosure, between 5 and 300 mHz.

As previously stated, coaxial cable usually comprises a center conductor member coated with a dielectric (core), with an outer conductor member superimposed on the dielectric. A mathematical relationship relating to high frequency attenuation for coaxial cable has long been known and is expressed generally as follows:

EQUATION 1.

$$A = \frac{(2.38577)\,(B)^{1/2}\,(F)^{1/2}}{\log\,(d_o/d_i)} \quad \frac{(c_i)^{1/2}}{d_i} + \frac{(c_o)^{1/2}}{d_o} + (2.77241)F(B)^{1/2}D$$

where:

- $F$ denotes frequency in megahertz
- $C$ denotes conductor resistivity in micro-ohm-cm ($c_i$ = center conductor resistivity and $c_o$ = outer conductor resistivity)
- $B$ denotes the relative effective composite dielectric constant (dielectric + gas)
- $D$ denotes dielectric loss angle (dissipation factor) for chosen dielectric (function of dielectric material used in unfoamed state)
- $A$ denotes d/b100 feet (attenuation loss in decibels per 100 feet of cable)
- $d_i$ denotes center conductor diameter in mils
- $d_o$ denotes outer conductor inner diameter in mils From Equation 1, it can be readily seen that attenuation in decibels/100 feet (db/100′) at a given frequency ($F$) for a specific center and outer conductor resistivities ($c_i$ and $c_o$) and diameters ($d_i$ and $d_o$) and dielectric loss angle (dissipation factor) is a function of B, the dielectric plus gas, i.e. foamed dielectric.

The relationship between foam density and such effective composite dielectric constant has been expressed by the following formula:

$$\frac{B - B_p}{3B} = \frac{V\,(B_a - B_p)}{(B_a + 2B)} \qquad \text{EQUATION 2.}$$

where:

- $B$ = the effective composite dielectric constant of dielectric plus gas
- $B_a$ = the dielectric constant of added gas per se ($B_a$ = 1 for air)
- $B$ = the dielectric constant of unfoamed dielectric ($B$ = 2.26 for polyethylene of 0.92g/cc density)
- $V$ = weight in grams of 1cc of the foamed dielectric per se.

Solving Equation 2 for $B$, one can plot foam density ($V$) (g/cc) vs. effective composite dielectric constant (gas plus dielectric) B and FIG. 1 represents such a plot for and employs data extracted from dielectric constants of chemically expanded polyethylene (commercial coaxial cable — Type 1), direct gaseous nitrogen injection expanded polyethylene (commercial coaxial cable — Type 2), and expanded polystyrene (commercial coaxial cable — Type 3). It can be readily seen from Equation 2 that a reduction in foam density ($V$) will result in a reduction in effective composite dielectric constant $B$, which in turn, see Equation 1, results in a reduction in attenuation loss, everything else remaining the same*.

*Note: Dissipation factor is a measure of dipole moment loss (chemical residues are contributors to such dipole moment loss).

Prior to the present invention, it has not been readily possible to provide dielectric materials for use in coaxial cables which provided cable with both good mechanical properties and good electrical properties. One either had good mechanical but undesirable electrical properties (polyolefins) or the reverse with polystyrene. It is towards this end that the instant invention is focused, desirable electrical and mechanical properties using a polyolefin.

SUMMARY OF THE INVENTION

Coaxial cable is provided by the instant invention having both good mechanical and electrical properties with a dielectric formed from expanded polyolefin.

A major object of the present invention is to provide a novel coaxial cable having a combination of good mechanical and electrical properties.

Another object of the present invention is to provide a novel coaxial cable product which comprises an expanded polyolefin as a dielectric and which has an attenuation in db/100′ equal to or lower than the same size cable employing polystyrene as a dielectric material between 5–300 mHz.

A further object of the present invention is to provide a novel coaxial cable product which comprises an expanded polyolefin as a dielectric and which has foam densities between 0.10 and 0.21 g/cc.

A further object of the present invention is to provide a novel process whereby a polyolefin may be extruded onto the center or core conductor of coaxial cable so as to provide a dielectric layer having both good mechanical and electrical properties.

A still further object of the present invention is to provide a novel process for making coaxial cable having both good mechanical and electrical properties, without the need for drying the cable prior to swedging the outer conductor onto the outermost diameter of the dielectric.

An additional object of the present invention is to provide a novel process for making coaxial cable having both good mechanical and electrical properties using commercially available non-proprietary polyolefin.

A still further object of the present invention is to provide a novel coaxial cable which comprises an expanded polyolefin that is firmly bonded to the center conductor of the cable.

These and other objects are achieved by rendering a polyolefin cellular during the extrusion thereof on a center or core conductor of a coaxial cable, as described below in more detail, using a mixture of gases as a blowing agent, such being introduced into the barrel of an extruder while such gases are in liquid form.

DESCRIPTION OF THE PREFERRED EMBODIMENT

Apparatus used in Manufacture

Figure 3:
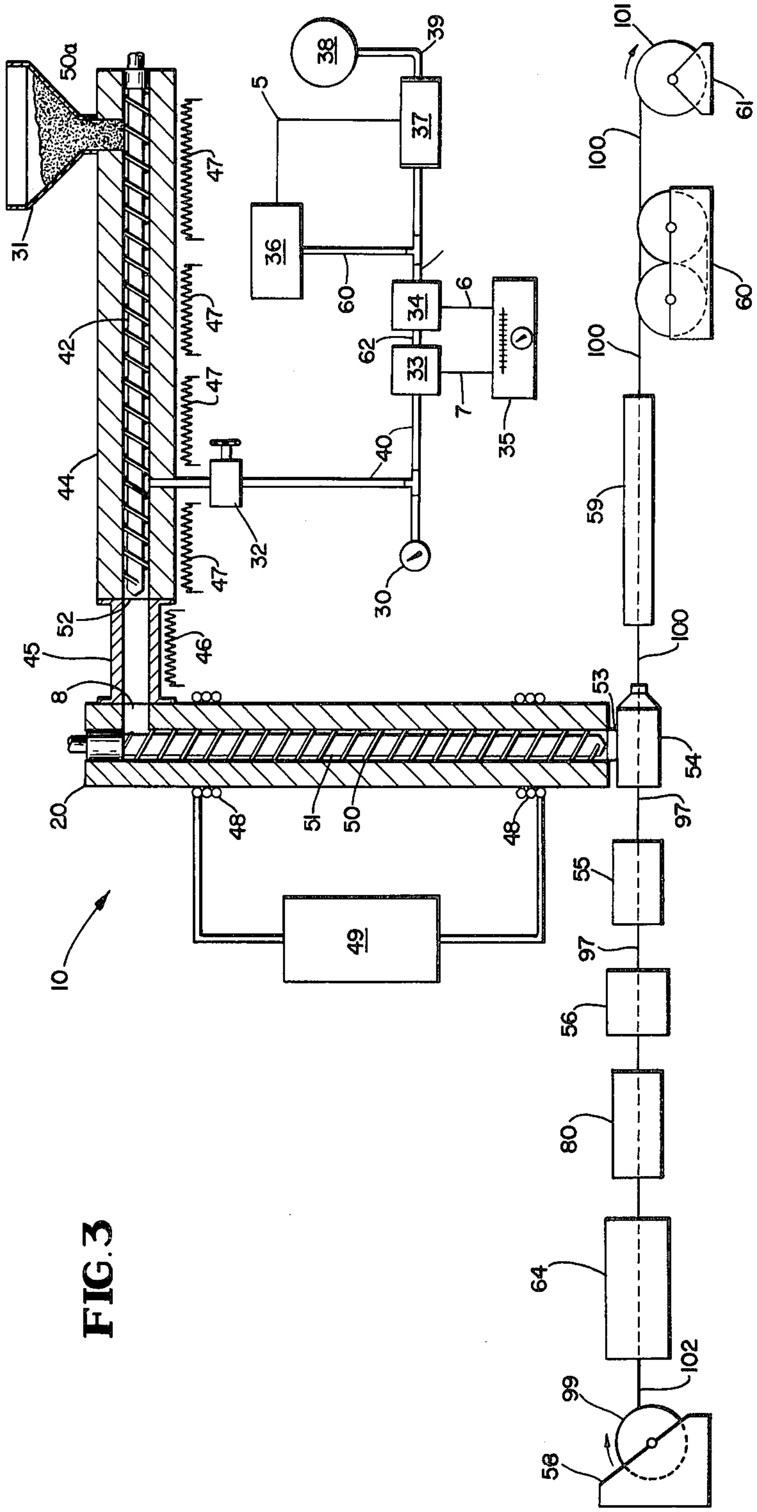
FIG. 3 is a flow sheet in schematic form showing the apparatus used in the manufacture of the coaxial cable that is the subject of this invention.

The apparatus used in making the coaxial cable of the present invention is generally designated at 10 in FIG. 3. Element 31 is a conventional hopper attached to a first extruder 44 through which a polymer, mixed with a nucleating agent more fully described hereinafter, is fed into the extruder. Elements 47 are conventional heating means that maintain the extruder and the materials that are being mixed and extruded therein at desired predetermined temperatures. A conventional auger screw us shown by element 42. Element 38 is a tank for containing a liquid or mixture of liquids capable of being converted into a gas or mixture of gases upon exposure to atmospheric pressure, and is connected by conduit 38 to a motor driven high pressure pump 37. High pressure pump controller 36 is a servo mechanism which senses the output pressure of pump 37 through conduit 60 connected to the output side of high pressure pump 37 through conduit 61. The motor of pump 37 is responsive to and in electrical connection with high pressure pump controller 36 by lead 5. Connected to the output (downstream) side of conduit 61 is flow meter 34, which in turn is connected through conduit 62 to flow metering valve 33. Flow meter 34 and flow metering valve 33 are responsive to and connected to flow controller and indicator 35 through appropriate connections 6 and 7. Conduit 4 connects flow metering valve 33 to pressure gauge 30 and also connects valve 33 to injection valve 32. Injection valve 32, is attached to the interior of extruder 44.

Output port 52 of extruder 44 is connected to coupler 45, which is heated by conventional heating means 46. Coupler 45 in turn is connected to the input port 8 of a second extruder 20 which has the same basic internal construction as extruder 44, except for the hopper arrangement. Extruder 20 has a conventional auger member 50 with appropriate flites shown as 51. Extruder 20 is cooled by cooling means 58 (such as coils) through which a cooling fluid is circulated, such fluid as being also circulated through heat exchanger 49. Extruder 20 has an output port 53, which is connected to an input port (not shown) of cross head die 54.

Figure 4:
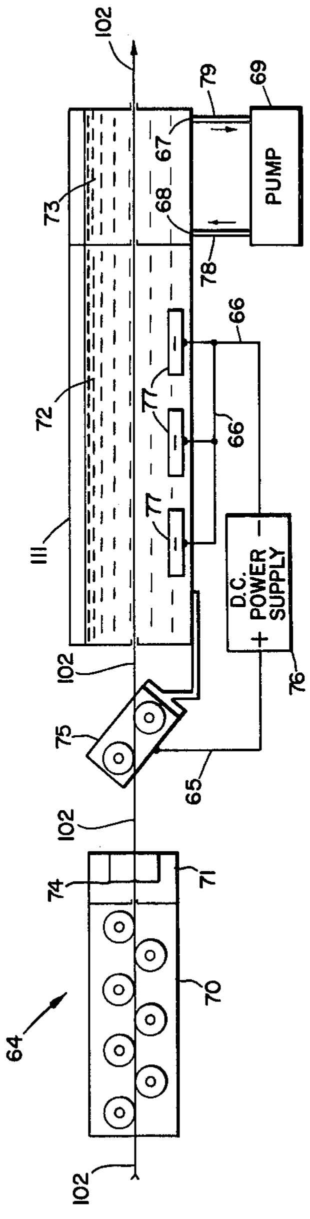
FIG. 4 is a cross section schematic representation of the wire straightening and wire electropolishing apparatus as generally indicated at 64 of FIG. 3.

Element 58 represents a payoff stand, which is adapted to hold a reel on which wire is wound. An assembly 64 is shown in FIG. 4 to comprise a wire straightener 70, a sizing die 74 and an electropolishing apparatus 111 respectively. Downstream from said wire sizing die 74 is an anode 75, which is connected by suitable leads 65 to the positive terminal of dc power supply 76. DC power supply 76 is connected by lead 66 to cathodes 77. Cathodes 77 are positioned in a tank 72, which is adapted to contain an electrolyte solution more fully described below. Tank 72 is positioned approximately adjacent to a rinse tank 73 which is adapted to contain a solvent (e.g. ethyl alcohol). Tank 73 has an outlet and inlet ports 67 and 68 and such are connected to a motor driven pump 69 by conduits 78 and 79 respectively, the pump being adapted to circulate the solvent in tank 73 in a predetermined desired manner.

Figure 5:
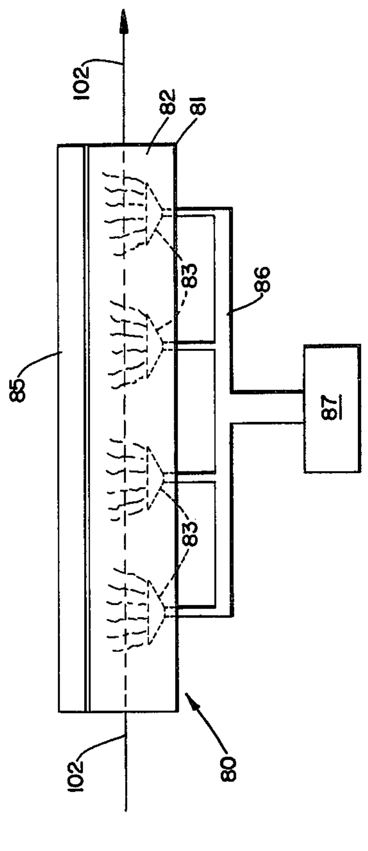
FIG. 5 is a cut-away schematic representation of apparatus used to heat uncoated coaxial cable center conductor during the manufacture of coaxial cable as generally indicated at 80 in FIG. 3.

As shown in FIG. 5 is a preheat device 80 (standard gas furnace) comprises a lower housing 81 and fire chamber 82, in which are mounted a plurality of burner ports 83. Burner ports 83 are connected by conduits 86 to appropriate supply of air and propane gas, which is shown in a schematic form as 87.

Downstream from wire preheat device 80 is wire treatment device 56 (FIG. 6) comprised of a hopper 93 adapted to feed granular resin material into extruder barrel 91, in which there is an extruder auger 94. Output port 95 of the extruder 91 is adapted to be connected to a conventional cross head wire coating device 92, which in turn is adapted to receive and coat wire coming from wire preheat device 80.

Downstream from wire coating apparatus 56 is heat exchanger 55 (FIG. 3), which is adapted to cool the wire emerging from device 56.

Downstream from cross head die 54 (previously explained) is a conventional air ring (not shown) interposed between cross head die 54 and a conventional heat exchanger (water trough) 59. Downstream from heat exchanger 59 is located a pulling capstan 60, which provides the moving force for the wire. Downstream capstan 60 is a takeup unit 61 on which reel 101 is rotatably disposed, adapted to continuously receive coated center conductor as it is manufactured.

PROCESS DESCRIPTION

Raw Material Compound Description and Preparation

With reference to FIG. 3, material to be extruded is prepared in a separate dry blending and tumbling operation (not shown), combining the basic polyolefin (polyethylene or polypropolyne) with a nucleating agent. Nucleating agents as used in the hereinafter disclosed process are more fully disclosed below.

The basic unexpanded polyolefin raw material used may range in density from 0.90 to 0.96 g/cc. Low and high density polyethylene as well as polypropylene may be used in the instant invention with equal success, having a melt index in the range of 0.01 to 10 decigrams/minute. A melt index of 2.0 decigrams/minute is used in the preferred embodiment.

Necessary to the process of manufacture is a nucleating agent to provide sites for cell formation during the extrusion process, cell uniformity and distribution being a function of nucleation. Successfully used nucleants in the instant process include the following:

1. Azobisformamides
2. Calcium Carbonate
3. Silica Products ($S_1 O_2$)
4. Silicates (Kaolins, Mica, Talc Aluminum Silicate, Calcium Silicate)

Particle size of nucleants range from 0.01 to 50 microns. The preferred nucleant used in the process of the instant invention is one of the azobisformamides group, such being obtainable from Uniroyal Company and commercially known as Cellogen AZ 130, actually an azodicarbonamide. This material has a rather fine particle size (2.5 to 3.5 microns) and a desirable effect on the ultimate cell uniformity, size and distribution. Such a material has been previously used to achieve both nucleation sites and as a source of gas for foaming, the foaming action coming about as a result of its thermal decomposition. In such a process, the nucleating agent azodicarbonamide decomposed, releasing nitrogen gas, water vapor, and left a sulfurous residue. In the process of the present invention, however, the azodicarbonamide nucleating agent is kept well below its decomposition temperature and thus acts only as a nucleating agent.

The amount of nucleating agent added to the base unfoamed polymer may be varied according to whatever desired effect is sought in a concentration range between 0.00001 to 10% of weight of the base polymer. In a preferred embodiment of the process herein disclosed, a concentration of 0.0154% by-weight is utilized, i.e. 3.5 grams nucleating agent per 50 pounds of polymer.

PRIMARY EXTRUSION PROCESS

Primary extrusion 44 has four heating zones controlled by heating elements 47. Previously prepared compound (polymer plus nucleating agent) is loaded into hopper 31 and gravity fed through feed port **50*a* where it comes in contact with rotating primary extruder screw 42. As the compound is mixed, masticated, heated and pressurized, it is transported from right to left by screw 42. Mechanical sheer energy and heat derived from elements 47 in zones 1 to 4 cause only the polymer to become molten, the nucleating agent remaining undecomposed and in the solid particulate state, but homogeneously distributed throughout the molten polymer. Temperature in zones 1 to 4, reading chronologically from right to left, are as follows: Hopper or first zone 325° to 350° F; Second zone 350° to 375° F; Third zone 375° to 400° F and Fourth zone or exit port 375° to 390° F. Auger 42 in its forward position has a thickening root diameter that causes increasing pressure to be applied to the molten polymer, such pressure reaching a range of 1,000 to 4,000 pounds per square inch in the vicinity where injection valve 32 is attached to the inside of extruder 44**.

Blowing Agent - Type, Pressurization, Flow Metering and Injection

In the process of this invention, as opposed to processes disclosed in the prior art, a foaming/blowing agent in liquid form is injected under pressure through valve 32 into the molten polymer. Such a blowing agent should be non-toxic, non-corrosive, stable and non-flammable. Fluorocarbon compounds are considered ideal, and the following have been used to carry out the instant invention:

1. $CCl_2F_2$ (Dichlorodifluoromethane) "Freon 12"
2. $CClF_2$ - $CClF_2$ (Dichlorotetrafluoroethane) "Freon 114"
3. $CCl_3F$ (Trichlorofluoromethane) "Freon 11"
4. $CCl_2F$ - $CClF_2$ (trichlorotrifluorethane) "Freon 113"
5. Mixtures of 1–4.

Use of Dichlorodifluoromethane (1 above) alone resulted in cell size that was too small and insufficient foam density reduction resulted. See element 25 of FIG. 7B. When 100% Trichlorofluoromethane (3 above) was used, it was found that cell size was too large and non-uniform. See element 24 of FIG. 7A. Blends of 15%/85% to 85%/15% of these to compounds were found to be satisfactory and a preferred embodiment of 50%/50% by-weight of liquid Trichlorofluoromethane with liquid Dichlorodifluoromethane was ideal, cells of a satisfactory size, uniformity and strength being easily obtainable. See element 26 of FIG. 7C.

Liquid foaming (blowing) agent is stored in low pressure blowing agent reservoir 38, which is connected by means of conduit 39 to a pump 37 capable of supplying the liquid foaming agent at high pressure. Input pressure of the liquid foaming/blowing agent to pump 37 is typically between 50 and 1200 psig. High pressure pump 37 builds up the pressure of the liquid blowing agent to approximately 6,000 psi. Subsequently, the liquid blowing agent is discharged through supply line 61. High pressure pump controller 36 senses the pressure of the liquid blowing agent through conduit 60 as it emerges from pump 37 and through well known servo mechanisms controls high pressure pump 37 to achieve a constant predetermined pressure. Liquid blowing agent under such predetermined pressure flows through conduits 61 through flow meter 34 and by means of conduit 62 through flow metering valve 33. Flow controller indicator 35, through leads 6 and 7, senses an output signal provided by flow meter 34 as a function of liquid blowing agent flowing therethrough, compares it to the pre-set and predetermined desired flow setting, and then regulates metering valve 33 to achieve a desired pre-selected (constant) flow rate of liquid blowing agent. Pressurized and metered liquid blowing agent then flows through line 40, the final pressure thereof being indicated by gauge 30, through injection valve 32 into the molten polymer inside of extruder 44, such polymer being forwarded and rendered into a molten state at that point by auger screw 42. Obviously, the pressure of the compressed liquid blowing agent at the point of introduction into extruder 44 is higher than the pressure of the molten polymer inside. Such extruder pressure varies with extruder speed, temperatures and types of compound, but is typically within the range of 1,000 to 4,000 psig. Blowing agent enters the polymer melt as a liquid and remains a liquid until it is exposed to atmospheric pressure. The blowing agent injected into the mixture is not exposed to atmospheric pressure until it exits from die 54. Subsequent auger screw action mixes, blends and conveys the molten mixture and blowing agent through zone 4 (final zone) of primary extruder 44, into coupling zone 45. Zone 45 is temperature controlled by heating element 46 between 300° and 350° F and is adapted to convey the blended mixture of molten polymer, nucleating agent, blowing agent mixture, hereinafter referred to as "the mixture," to secondary extruder 20. Until the coated wire emerges from die 54, the temperature and pressure conditions of the mixture are such that the blowing agent remains in its liquid state.

SECONDARY EXTRUSION PROCESS

Extruder 20 is a secondary extruder, the function of which is to forward the mixture to wire coating cross head die 54. This function must be done in such a manner that the temperature of the mixture is greatly reduced from the temperature needed in the primary extruder 44, i.e. temperatures needed to achieve melting, blending, masticating and mixing of polymer, nucleating and blowing agents. Cooling of the aforementioned mixture is achieved by keeping barrel of extruder 20 at a pre-determined temperature by means of heat exchanger 49 and associated coils 48. Such is done in conventional manner by circulating through coils 48 an oil cooling fluid sold by the Texaco Company under the trademark "TEXATHERM." This is done in the conventional manner by circulating the cooling oil by means of a pump (not shown) through heat exchanger 49 and coils 48. Temperatures in the secondary extruder 20 in the preferred embodiment are maintained in the neighborhood of 220° to 250° F as the mixture is forwarded, cooled, and metered into cross head die 54. Cross head die 54 is a standard tip/die configuration used in wire coating. Pressures in extruder 20 and die 54 range from 2500 psig at entrance port 8 to 1,000 to 2,000 psig inside of die 54. As the mixture exits die 54 around the wire 97 with its initial previously applied coating, the liquid blowing agent becomes exposed to atmospheric pressure and is thus vaporized, causing the molten polymer to expand and develop a vesicular structure. Cells are thus formed in the molten polymer upon applying the mixture to coated wire 97 (more fully explained below) and exposure thereof to atmospheric pressure. The wire moves through cross head die 54 in a left to right direction.

WIRE CONDITIONING

Uncoated center conductor wire 102 is provided on a reel 99 mounted in a wire pay-off stand 58. Pulling capstan 60, located downstream from cross head die 54, pulls wire 102 from pay-off stand 58 through several significant wire conditioning steps, more fully explained hereinbelow which occur prior to the wire entering into the cross head die 54 where it receives its coating of polyolefin.

From payoff stand 58 uncoated center conductor wire 102 passes through a conventional wire straightener 70 (FIG. 4). Subsequently, the wire than passes through a wire drawing station 71 where the wire is drawn through a precision sizing die 74 to achieve wire diametrical concentricity.

Upon exit of wire 102 from wire drawing station 71 (FIG. 4), it travels towards an electropolishing device where it is first contacted by anode 75, which is connected to the positive terminal of a dc power supply 76. Upon the wire passing into an electropolishing tank 72, it is submerged in an ionized electrolyte solution comprised of 5 parts of 85% phosphoric acid, 6 parts of 95% ethyl alcohol and 10 parts of distilled water (all parts by-weight). Electropolishing tank 72 is constructed of material non-conductive to electricity and cathodes 77 are mounted submerged in the ionized electrolyte. Cathodes 77 are attached to the negative terminal of dc power supply 76, thereby creating an electrochemical cell whereby dc current is passed through anode 75 along the wire into the electrolyte by positively charged ions from the wire to cathodes 77. Because the wire is at anode potential, anodic dissolution occurs resulting in the wire having a polished surface. The preferred embodiment of the instant process uses 2.5 volts (VDC) and direct current at 5 amperes.

Surface roughness of a coaxial cable center conductor is detrimental to the desired electrical properties of the finished product when the cable is used in high frequency electrical transmission above 100 kHz. Therefore, an electropolished, oxide-free surface is highly desirable. Surface resistivity is decreased by 14% by running center conductor wire 102 through the aforementioned electropolishing apparatus. With such a reduction comes a reduction in high frequency transmission attenuation of approximately 4%. The aforementioned percentage reductions are in comparison to conductor wire that was not electropolished as described.

Upon exit of wire 102 from the electropolish tank 72, it is passed through rinse tank 73 which contains a solvent. In a preferred embodiment, the solvent is ethyl alcohol and is used to rinse residue and electrolytes from the wire 102. It is circulated through pump reservoir 73 by means of pump 69 conduits 78 and 79 and ports 68 and 67 in a conventional manner.

From rinse tank 73, center conductor wire 102 enters a wire preheat device 80 shown in FIG. 5. This device is a standard gas furnace consisting of lower burner housing 8 containing a fire chamber 82 and a plurality of mounted burner ports 83. Lower housing 81 is covered by an insulated cover 85. A mixture of air and propane is supplied through mixing valve 87 to burner ports 83 from a suitable source (not shown). When the propane air mixture is combusted in the fire chamber, the internal temperature of the wire preheat device 80 is allowed to rise sufficiently above ambient temperature to cause the wire passing through wire preheat device 80 to rise to a temperature in the range of 325° to 500° F. In the preferred embodiment, a wire temperature of 450° F is employed.

Figure 6:
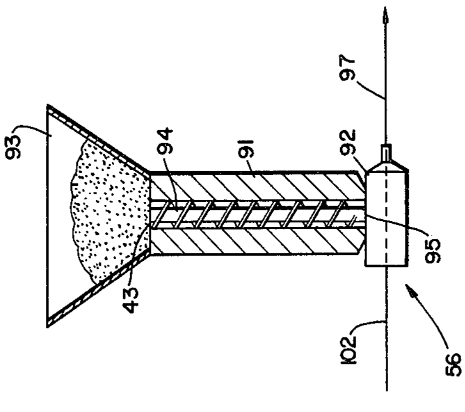
FIG. 6 is a cross sectional schematic representation of the apparatus used in coating the wire used as the coaxial cable center conductor as shown as item 56 in FIG. 6.

Wire 102 preheated in the aforementioned manner emerges from wire preheat device 80 and then proceeds through wire treatment device 56, see FIG. 6, where it receives a thin coating of a selected type of plastic. Such center conductor coating (unexpanded plastic) has been found to be necessary in order to accomplish sufficient bonding of the cellular material subsequently applied to the wire by means of cross head die 54. Without such coating, subsequently applied cellular material does not reliably, uniformly and consistently bond to center conductor 102 in a manner to seal off all possible paths by which water and/or water vapor may permeate along the wire plastic interface. Water and/or water vapor so migrating, causes oxidation and this in turn causes center conductor wire surface corrosion and thus an increase in high frequency transmission attenuation. Types of material used to provide such coating are polyethylene, both high and low density, as well as either one or both of the aforementioned polyethylenes modified by the following compounds in a manner well known in the prior art (see for example, United States Patents to Jachimowicz and Rugg, Ser. Nos. 3,233,036 and 2,970,129 respectively):

1. ethylene acrylic acid;
2. ethylene methacrylic acid;
3. ethylene ethyl acrylate; and,
4. ethylene vinyl acetate.

A preferred embodiment of the instant invention utilizes an ionomer resin of a high molecular weight polyethylene such as that bought from Dupont Corporation sold under the trademark SURLYN 1652. This compound is a low density polyethylene modified in a known manner by ethylene methacrylic acid.

Reference is now made to FIG. 6, where wire treatment device 56 is shown comprised of hopper 93 in communication with the input port 43 of a small extruder 91 having an output port (not shown) of a standard cross head wire coating die 92. Extruder 91 is electrically heated and controlled in a well known manner by means (not shown) at approximately 350° F in the preferred embodiment. Material used to coat the center conductor wire is put into the hopper, forwarded and melted and extruded onto the moving, electropolished, heated wire 102 to a thickness of approximately 0.00025 to 0.005 inches, in any case, no more than 5 mils (0.005 inch) and no less than ¼ (0.00025 inch). This thin inner unexpanded coating of plastic is indicated at 22 in FIGS. 7A–C. In the preferred embodiment wire to be coated enters cross head die 92 at a temperature of 450° F. The preferred embodiment uses an extruder melt temperature of the coating polymer of approximately 390° F.

Coated center conductor wire 97 is cooled in a subsequent step by passing it through wire heat exchanger 55, shown in schematic representation form in FIG. 3. This cooling step is used to remove sufficient heat from coated wire 97 to the extent that any heat possessed by it will not adversely affect cell formation by the mixture that is to be subsequently coated onto it. If coated wire 97 is too hot, ruptured cells and voids in the interface between the foaming mixture and coated wire 97 results. If coated wire 97 is not hot enough, however, poor bonding of the foaming mixture results. In the preferred embodiment coated wire 97 emerges from heat exchanger 55 at 180° F plus or minus 5° F.

Coated wire 97 passes through cross head die 54 (FIG. 3). Simultaneously, the mixture to be formed onto coated wire 97 is forwarded into die 54 by means of primary and secondary extruders 44 and 20 respectively. The mixture is coated onto once coated wire 97 and subsequently exposed to atmospheric pressure where it expands, as previously explained, forming a vesicular (foam) network of evenly distributed cells having a wall thickness of a desirable thickness. See element 26 of FIG. 7. The twice coated wire indicated at 100 is thus passed downstream of cross head die 54 through air cooling ring (not shown), conventional in the plastic extruding art. Such an air ring is used to cool the surface of the expanded polymer and to control the degree of expansion, i.e. the ultimate diameter of the foamed polymer.

From air ring (not shown), twice coated wire 100 composite — referred to in the trade as a "cable core" — enters heat exchanger 59 (water trough), and the cellular material is allowed to harden to the extent that the twice coated wire 100 (cable core) can be passed around pulling capstan 60 without disruption or weakening of the bond between the cellular coating and the wire itself. The outer foamed coating is indicated at 29 in FIG. 7C.

Pulling capstan 60 provides the moving force for wire 102, 97 and 100 throughout its movement in the aforementioned manufacturing process, from the time wire 102 leaves payoff reel 99 to the time it is received twice coated and wound on reel 101. Leaving capstan 60 twice coated wire 100 is spooled onto reel 101 in a wire takeup unit 61. Pulling capstan 60, wire takeup unit 61, reels 101 and 99 are known standard devices long used in the manufacturing of wire and cable.

Twice coated wire 100 wound on reel 101 is not actually a finished product. An outer conductor, which is indicated at 21 in FIGS. 7A–C, needs to be applied to it to complete manufacture. A metallic tube, usually made from copper or aluminum or one of their respective alloys, is threaded over the thus manufactured cable core and the threaded composite thus made is passed through a swaging die. The length and wall thickness of metal tube 21 vis-a-vis the length of the cable core length is predetermined so that after swaging, the extended length of the metal tube essentially equals that of the original cable core, a desired metal tube wall thickness is achieved and the metal tube as swaged fits snugly over the cable core.

For example, a cable core of 0.374 inches diameter and 3300 feet in length is threaded into an aluminum tube of 2000 feet in length, and 0.025 inches in wall thickness and 0.625 inches in outside diameter. After swaging, the aluminum tube fits securely and snugly over the cable core, whose diameter has been reduced slightly, i.e. to 0.362 inches. The aluminum tube now having a length equal to that of the cable core, an inside diameter equal to the diameter of the slightly compressed cable core (0.362) inches and a tube wall thickness of 0.025 inches, the overall diameter of finished cable being 0.412 inches.

Figure 2A:
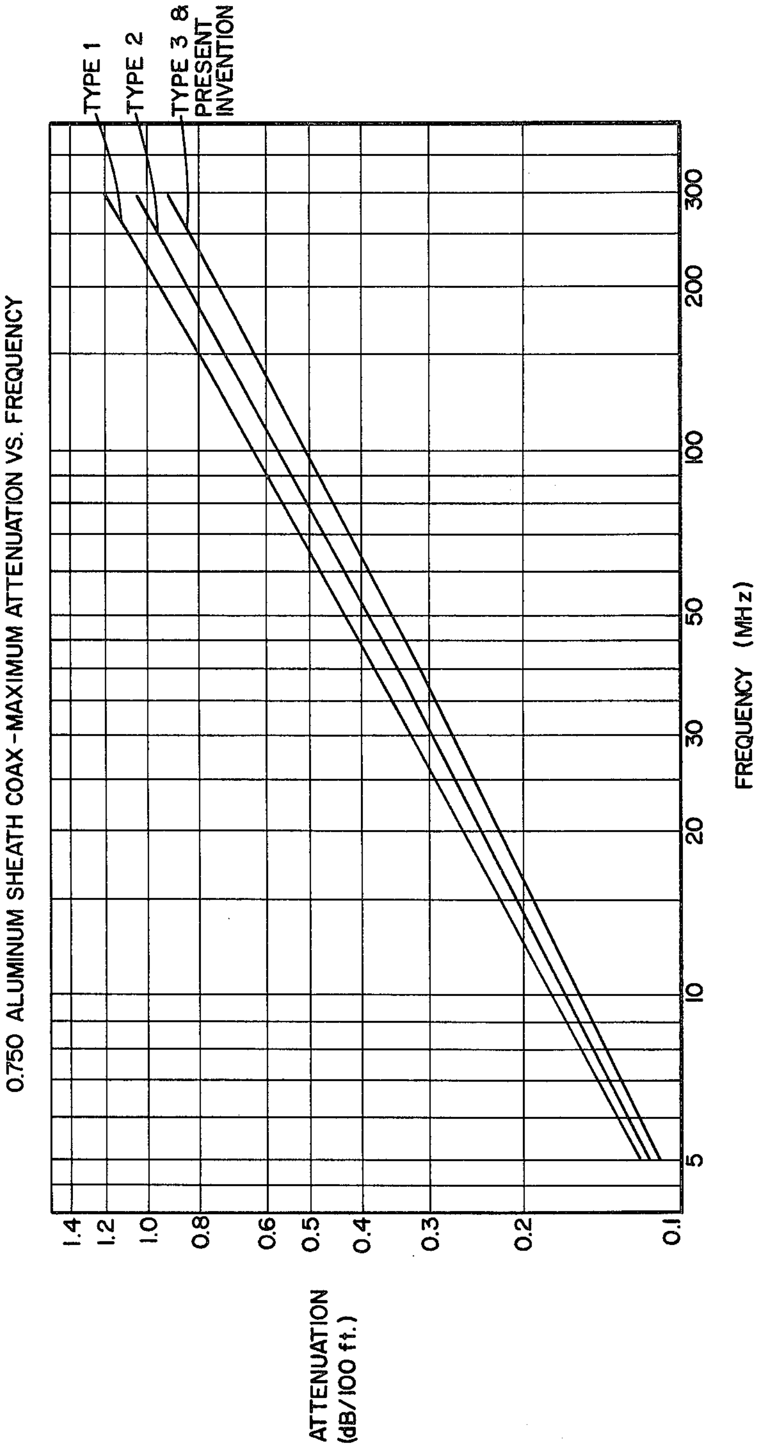
FIGS. 2A, 2B and 2C are logarithmic plots of attenuation (db/100′) vs. frequency in mHz (5–300) for a coaxial cable having 0.750, 0.412 and 0.5 inch outer conductor diameter of aluminum for Types 1, 2 and 3 commercial coaxial cable and coaxial cable manufactured by the method of the instant invention.
Figure 2B:
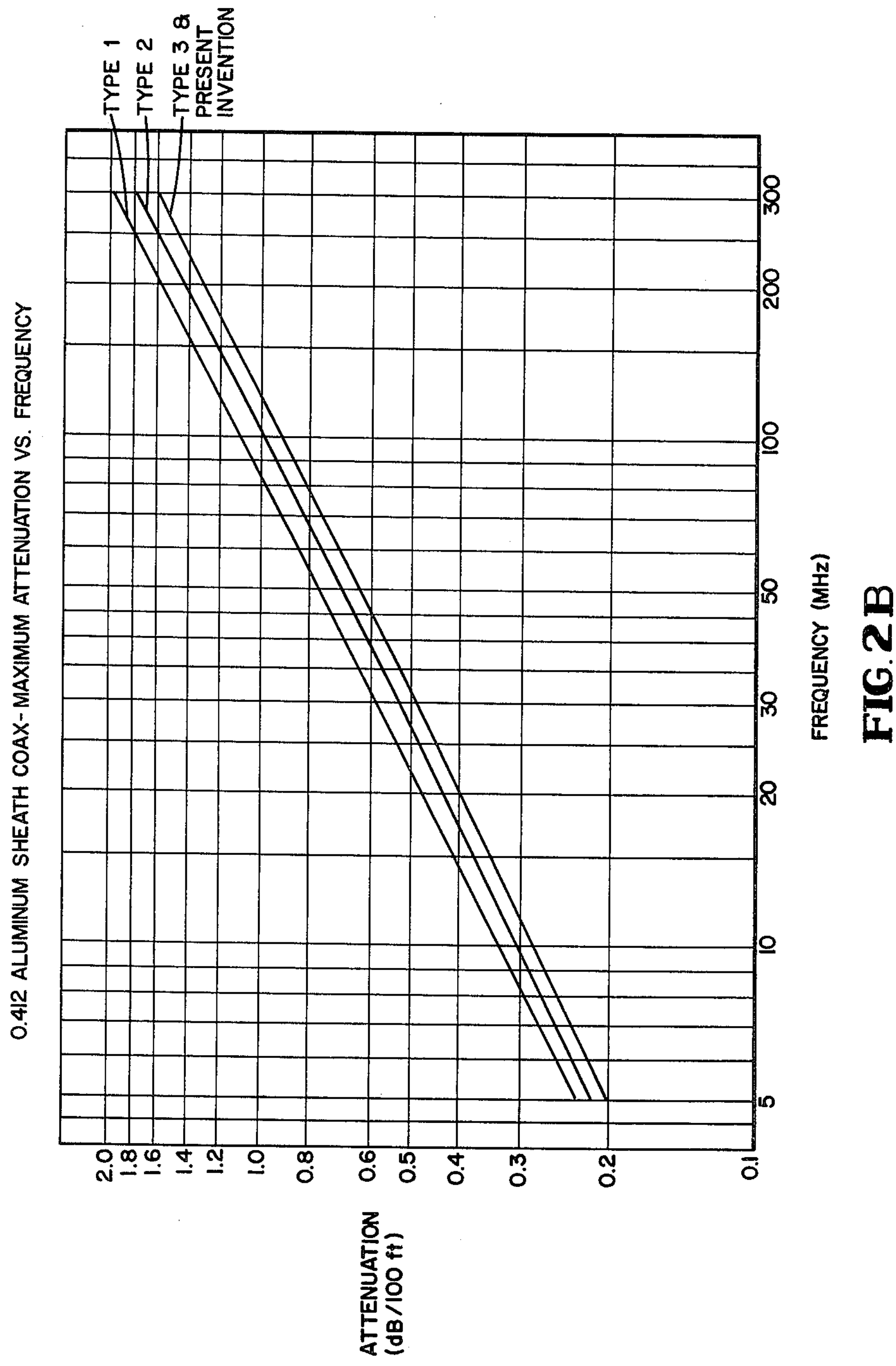
Figure 2C:
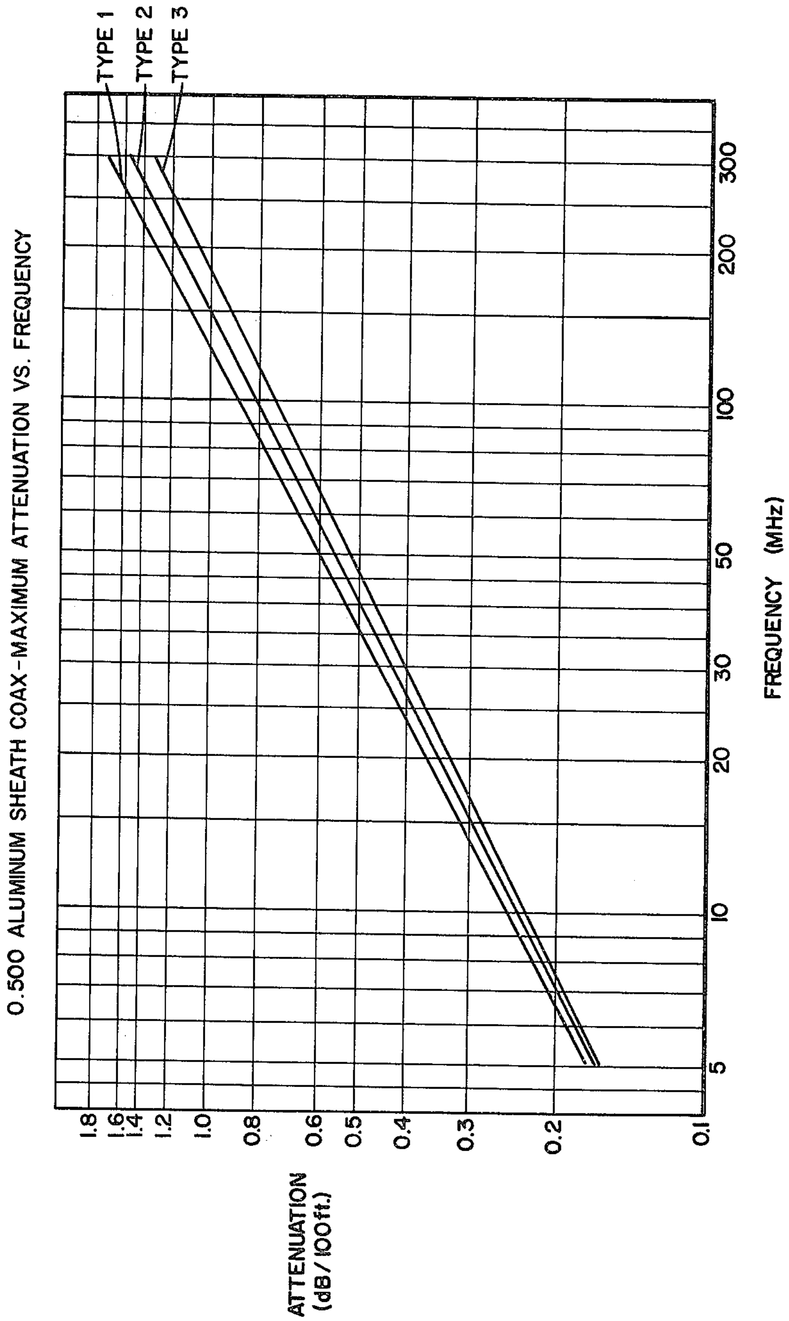

The foregoing disclosure describes a method of making a coaxial cable that employs a foamed polyolefin (polyethylene) as dielectric and has excellent mechanical properties, i.e. not brittle like polystyrene, but has all of the desirable electrical properties (db/100 ft. attenuation) as if the dielectric polystyrene between 5 and 300 mHz. Because of the low foam densities of the foam polyethylene, coaxial cable manufactured by the process of this invention has electrical properties (attenuation loss characteristics) that are identical to or better than that when expanded polystyrene is employed as a dielectric. For example, curve or plot identified as "Type 3" in FIGS. 2A, 2B and 2C give values (db/100 feet vs. frequency) for coaxial cable using polystyrene or foamed polyolefin according to the instant invention as the dielectric between 5 and 300 mHz. It is readily appreciated that the coaxial cable of the instant invention has several distinct advantages over the prior art polystyrene and prior art polyolefin type coaxial cable, such advantages being itemized as follows:

1. Absence of propensity of pentane to escape from the dielectric.
2. Dielectric does not become brittle.
3. Dielectric is elastic and retains its elasticity.
4. No propensity for explosive gases (pentane) to accumulate in an enclosure thereby creating an explosive product liability situation.
5. Absence of any path along or in the vicinity of the dielectric - center conductor interface where water vapor or water may migrate thereby avoiding corrosion of the conductor and attending increase in attenuation at high frequencies.
6. Avoidance of the necessity to manufacture in an environment precisely controlled with respect to humidity.
7. Avoidance of having to apply outer conductors within a given time period because of considerations relating to gases escaping from a dielectric.
8. All the electrical benefits (db loss per 100 feet) between the frequency range of 5 and 300 mHz of polystyrene coaxial cable but with the mechanical benefits (elasticity) derived from the use of polyethylene.
9. Avoidance of a drying step during manufacture to remove water.

Coaxial cable manufactured by the process disclosed has been produced with foamed polyethylene effective composite density (gas + polyethylene) from 0.29 to 0.10 g/cc. See Table II below, listing V(g/cc) vs. effective dielectric constant for coaxial cable made using the process disclosed.

| Effective Composite Density (V)(g/cc) | Effective Composite (D) |
|---|---|
| 0.1 | 1.1 |
| 0.15 | 1.15 |
| 0.2 | 1.2 |
| 0.25 | 1.27 |
| 0.29 | 1.32 |

With reference to Equation 1 — the unknowns therein, except for B, being essentially a function of cable design, i.e. physical dimensions and material choices — one can readily see that the value of B (effective composite dielectric constant) plays a large role in determining the value of A (attenuation loss in db/100 fee of coaxial cable). Everything else being held the same, lower values of B result in corresponding lower values for A. Obviously, lower A values are most desirable because lower energy (db) losses in transmission lines provide for fewer repeaters (active device) and thus more economical transmission systems without reduction in signal quality. The smaller the number of active devices, e.g. repeaters the lower the cost of a system.

Figure 1:
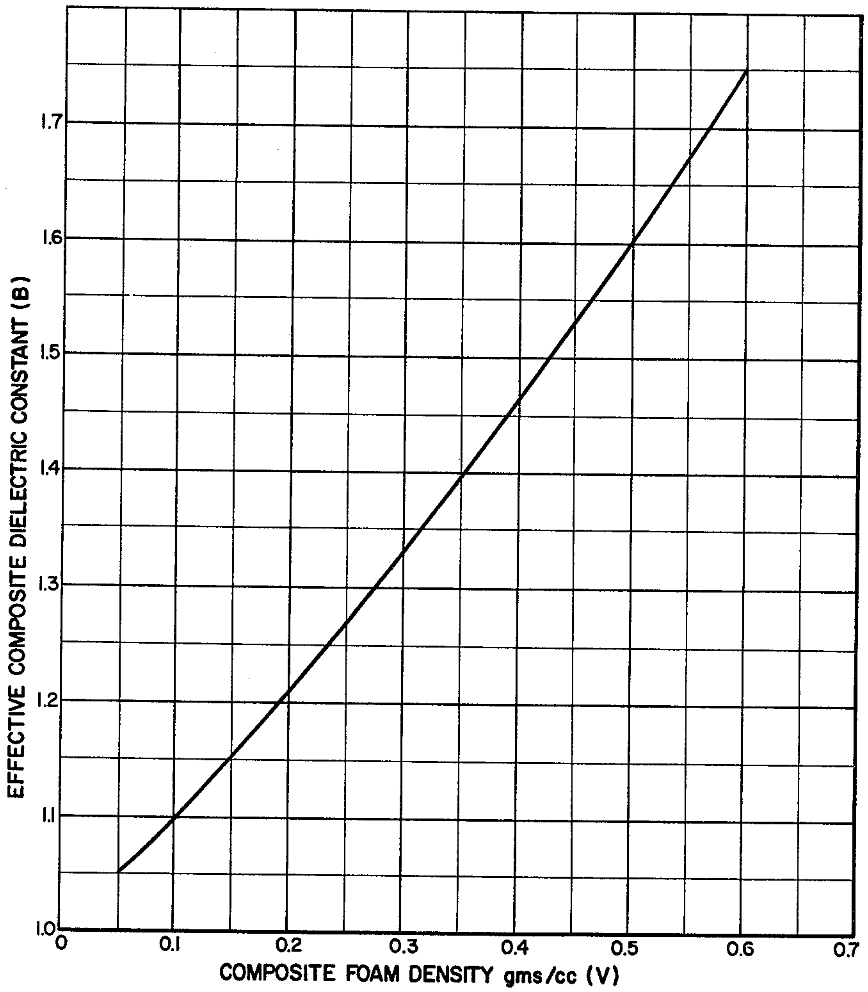
FIG. 1 is a plot of foam density in g/cc vs. dielectric constant.
Figure 7A:
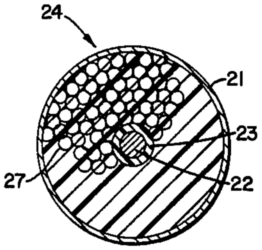
FIGS. 7A, 7B and 7C show three cross sectional views of coaxial cable by the process of this invention.
Figure 7B:
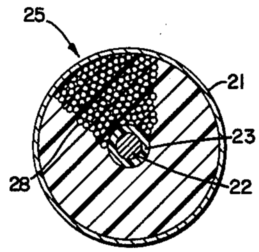
Figure 7C:
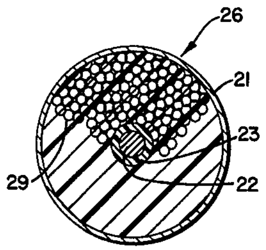

FIGS. 7A–C shows three cross-sectional view of coaxial cable made by the process of the instant invention. In FIG. 7A, the coaxial cable is indicated at 24 and has an outer conductor 21, foamed polyolefin dielectric 27, center conductor 22 and center conductor coating (unexpanded polyolefin) 23. Freon 11 was used to expand the polyolefin dielectric in this case. Compare size of cells 27 to size of cells 28 and 29. Like reference numerals of coaxial cables 25 and 26 indicate like elements of coaxial cable 24. Polyolefin dielectric 28 of coaxial cable 25, however was expanded using Freon 12 whereas a 50/50 mixture by liquid weight of Freon 11 - Freon 12 was used to expand the polyolefin dielectric of coaxial cable 26.

The blowing agent employed in this invention is referred to as a physical blowing agent to distinguish it from decomposable chemical blowing agents.

We claim:

1. A method of covering an electrically conductive wire with a polyolefin comprising:
(a) mixing a polyolefin with a nucleating agent to form a mixture;
(b) pressurizing above atmospheric pressure and heating said mixture to a temperature below that of the decomposition temperature of said nucleating agent sufficient to render said polyolefin molten;
(c) injecting into said pressurized molten polyolefin and nucleating agent mixture a physical blowing agent in a liquid state selected from the group comprising dichlorotetrafluoroethane, trichlorotrifluorethane and mixtures of trichlorofluoromethane and dichlorodifluoromethane and mixing under pressure the blowing agent in its liquid state with said pressurized and heated mixture of polyolefin and nucleating agent, said liquid blowing agent being convertible to a gas upon exposure to atmospheric pressure;
(d) cooling the mixture described in step (c) above to a predetermined temperature below that achieved in step (b) but above the solidification temperature of said mixture;
(e) coating the thus cooled mixture of step (d) onto a coating of unfoamed polyolefin on a wire and adhesively bonding it thereto;
(f) exposing the coated wire of step (e) to atmospheric pressure and temperatures below that achieved by step (d) for autogenously converting said blowing agent into a gas to expand said polyolefin by creating a multiplicity of cells wherein said gas is entrapped thereat, and solidifying the thusly expanded mixture.

2. The method of claim 1 wherein said liquid blowing agent is a mixture containing by weight between 15 to 85% $CCl_2F_2$ and 15 to 85% $CCl_3F$.

3. The method of claim 1 wherein said nucleating agent is selected from the group consisting essentially of calcium carbonate, silica products and silicates, and azobisformanides.

4. The method of claim 1 wherein said unfoamed polyolefin is modified by a compound selected from the group consisting essentially of ethylene acrylic acid, ethylene methacrylic acid, ethylene ethyl acrylate, ethylene vinyl acetate and mixtures thereof.

5. The method of claim 1 wherein said nucleating agent is azodicarbonamide.

6. A method of covering an electrically conductive wire with a polyolefin comprising:

(a) providing first and second extruders each having access and outlet ports, the outlet port of said first extruder being in communication with the access port of said second extruder and said second extruder having a die in communication with its outlet port, adapted for the simultaneous passage there through of molten plastic material and an inner conductor in the form of a wire;

(b) providing a mixture of polyolefin and a nucleating agent;

(c) pressurizing and heating said mixture in said first extruder between 1,000 and 4,000 psig and 325° to 400° respectively so as to melt the polyolefin but not to thermally decompose the nucleating agent;

(d) injecting into said heated and pressurized mixture in said first extruder a physical blowing agent in a liquid state selected from the group consisting of dichlorotetrafluoroethane, trichlorotrifluoroethane and mixtures of trichlorofluoromethane and dichlorodifluoromethane;

(e) transferring under pressure the mixture of polyolefin, nucleating agent and liquid physical blowing agent created by step (d) to said second extruder;

(f) cooling the mixture in the secondary extruder to a temerature below 250° F. and maintaining pressure on it within the range of 2,500 to 1,000 psig;

(g) passing a wire coated with an unfoamed polyolefin through the die of said second extruder and simultaneously coating the cooled mixture of step (f) on to said coated wire and adhesively bonding it thereto;

(h) exposing the coated wire of step (g) to atmospheric pressure and temperatures below that achieved by step (f) for autogenously converting said liquid blowing agent into a gas to expand the polyolefin by creating a multiplicity of cells wherein the gas is entrapped thereat, and then solidifying the thusly expanded mixture.

7. The method as defined in claim 6 comprising the additional step of maintaining the mixture before, during and after said wire is coated with the mixture, at a temperature and pressure below that which said nucleating agent decomposes.

8. The method of claim 6 wherein said unfoamed polyolefin is high or low density polyethylene and is modified by a compound selected from the group consisting essentially of ethylene acrylic acid, ethylene methacrylic acid, ethylene ethyl acrylate, ethylene vinyl acetate and mixtures thereof.

9. The method defined in claim 6 wherein said physical blowing agent is a liquid mixture contained by weight between 15 to 85% $CCl_2F_2$ and 15 to 85% $CCl_3F$.

* * * * *